United States Patent [19]

Maitani

[11] 4,189,222
[45] Feb. 19, 1980

[54] CAMERA WITH SLIDING CASE

[75] Inventor: Yoshihisa Maitani, Hachioji, Japan

[73] Assignee: Olympus Optical Co., Ltd., Japan

[21] Appl. No.: 859,011

[22] Filed: Dec. 9, 1977

[30] Foreign Application Priority Data

| Feb. 3, 1977 | [JP] | Japan | 52-11878[U] |
| Apr. 1, 1977 | [JP] | Japan | 52-41327[U] |
| Apr. 1, 1977 | [JP] | Japan | 52-41328[U] |

[51] Int. Cl.² ............................................. G03B 15/05
[52] U.S. Cl. ................................................... 354/126
[58] Field of Search ................. 354/23 R, 35, 60 R, 354/60 F, 126, 144, 145, 187, 212, 288, 149, 295; 362/4, 7, 8, 10

[56] References Cited

U.S. PATENT DOCUMENTS

| 3,252,394 | 5/1966 | Jakob et al. | 354/126 |
| 3,286,611 | 11/1966 | Lange | 354/126 X |
| 3,680,455 | 8/1972 | Meinunger | 354/187 |
| 3,741,097 | 6/1973 | Fukuda et al. | 354/212 |
| 3,750,549 | 8/1973 | Waaske | 354/286 |
| 3,988,752 | 10/1976 | Winkler et al. | 354/126 |
| 4,019,190 | 4/1977 | Ohmura | 354/145 |
| 4,065,779 | 12/1977 | Lange | 354/145 |

FOREIGN PATENT DOCUMENTS 1404702  9/1975  United Kingdom ............ 354/187

*Primary Examiner*—L. T. Hix
*Assistant Examiner*—William B. Perkey
*Attorney, Agent, or Firm*—Lerner, David, Littenberg & Samuel

[57] ABSTRACT

A camera includes a sliding case, which is movable between a first position in which it covers a region of the camera including at least a taking lens thereof and a second position in which the taking lens is exposed. The case is operatively connected with other mechanisms such as a film winding mechanism, a shutter charging mechanism or the like, and is also operatively connected with a power switch for an electrical circuit such as a photometric device or a strobo unit. A reciprocating movement of the case between the two above-mentioned positions establishes a photographable condition of the camera in which the taking lens is exposed.

7 Claims, 14 Drawing Figures

CAMERA WITH SLIDING CASE

BACKGROUND OF THE INVENTION

The invention relates to a camera with sliding case.

A camera with sliding case is known and is commonly called a pocket camera. Such camera is constructed such that it is contained in a sliding case which is formed of two parts. One part of the case fixedly carries the body of the camera while the other part is supported in a slidable manner relative to the camera body so that it is movable between a first position in which a region of the camera body including at least a taking lens and a viewfinder is covered and a second position in which they are exposed. When not use, the slidable part of the case is moved to the first position in which the taking lens and viewfinder of the camera body are covered, thus completely encasing the camera body within the case for the convenience of carrying it about and making the assembly dust-proof. When it is desired to use the camera, the slidable part of the case may be moved to the second position in which the taking lens, viewfinder and other part of the camera which are necessary to take a picture may be exposed. The movement of the slidable part of the case may be utilized to operate a film winding mechanism. Thus, the sliding part is operable as a film winding lever. This simplifies the general arrangement of the camera to enable a compact and light weight camera assembly to be provided.

However, in the conventional cameras of this kind, a power switch for an EE mechanism or other electrical circuit had to be operated separately from the movement of the slidable case part. It will be obvious that a further convenience can be gained by allowing a strobo unit to be easily mounted on the camera to permit a flashlight photography. However, when the strobo unit is used in combination with such camera, the power switch must be closed each time the strobo unit is operated. This represents an inconvenience in use, and in actual use, the operation of the switch may be inadvertently overlooked to cause a wastage of the battery and a loss of the intended photographing operation.

SUMMARY OF THE INVENTION

It is a first object of the invention to provide a camera with sliding case which is effective to operate a power switch for an electrical circuit such as an EE mechanism as the case is moved.

It is a second object of the invention to provide a camera with sliding case including a strobo unit which is provided with a strobo fixture and a strobo power supply switching member disposed for cooperation with an accessory shoe and a switch operating member, respectively, mounted within the sliding case so that the power switch of the strobo unit may be automatically closed when the case is moved to a position in which the taking lens is exposed.

It is a third object of the invention to provide a camera of the kind described in the immediately preceding paragraph in which the power switch of the strobo unit is automatically closed as the case is moved to a position in which the taking lens is exposed and in which a film winding operation is performed by a movement of the sliding case to a position in which it covers the taking lens.

DESCRIPTION OF PREFERRED EMBODIMENTS

Figure 1:
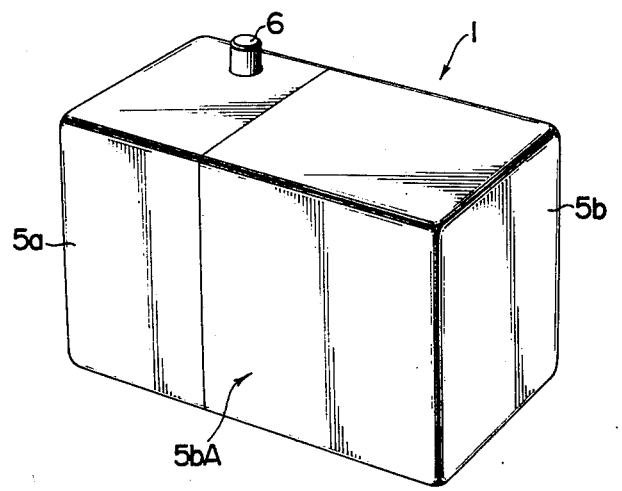
FIGS. 1 and 2 are perspective views of the camera with sliding case, FIG. 1 showing the camera when not in use and FIG. 2 showing the camera in use.
Figure 2:
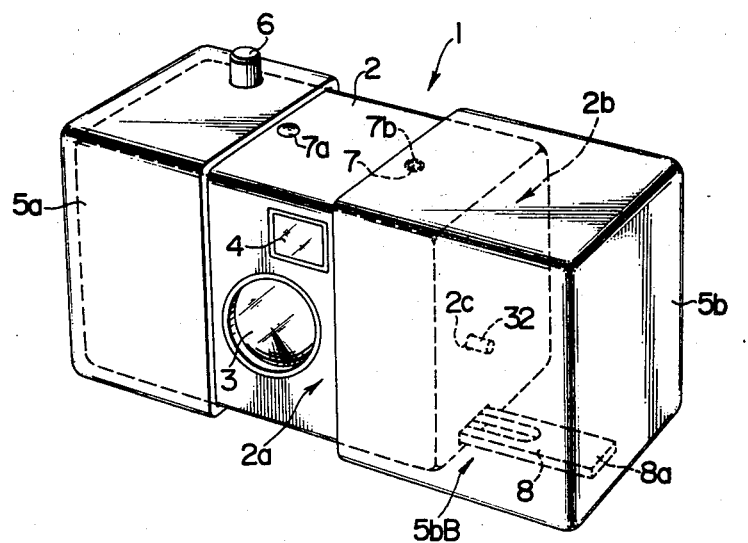

Referring to FIG. 1, there is shown a camera 1 with a sliding case as it appears when not in use. The use position of the camera is shown in FIG. 2. A camera body 2 includes a front surface 2a, and a taking lens 3 is disposed centrally therein. A window 4 for a viewfinder is disposed above the lens to the right thereof. A portion of the camera body 2 which is located to the left of the taking lens 3, as viewed in FIG. 2, is housed within a stationary case 5a, through the top panel of which a shutter button 6 projects outwardly. It is to be noted that the stationary case 5a is secured to and integral with the camera body 2.

The right-hand portion of the camera body 2 is adapted to be housed within a case 5b which is disposed to be slidable with respect to the camera body 2. Specifically, the slidable case 5b is movable between a first position 5bA (see FIG. 1) in which it covers at least the taking lens and the window 4 of the camera body 2 and a second position 5bB in which the taking lens 3 and the window 4 are exposed. When brought to its first position 5bA, the camera 1 is not used, and a recess 7a formed in the top wall of the camera body 2 is engaged by a resilient dowel formed on the inner wall of the case 5b, thus forming a click stop mechanism which releasably maintains the case 5b in such position. When the case 5b is moved to the second position 5bB, the camera 1 can be used, and another recess 7b formed in the top wall of the camera 2 is engaged by the dowel 7 to maintain the case 5b in this position.

Figure 3:
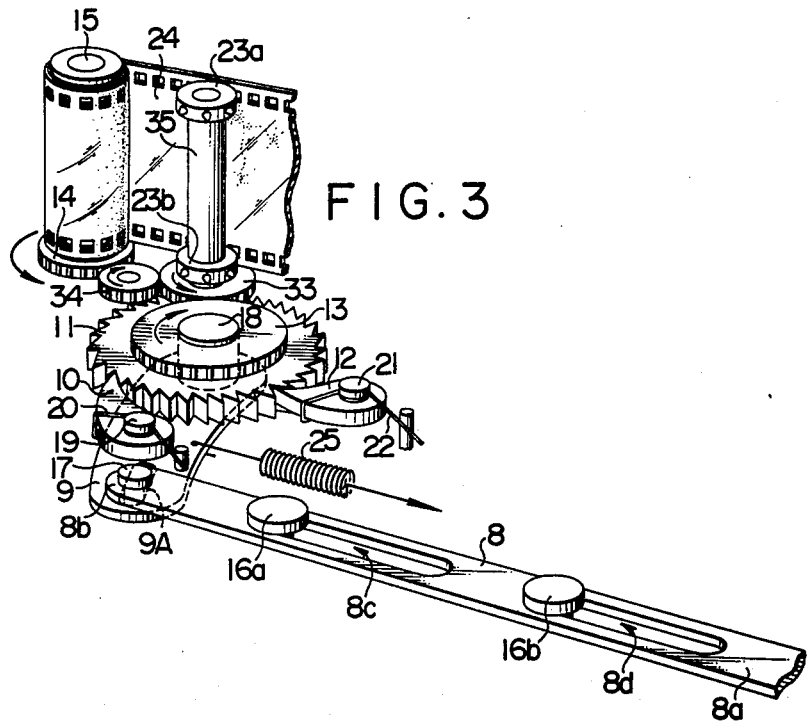
FIG. 3 is a perspective view of a film winding mechanism which is internally housed within the camera.
Figure 5:
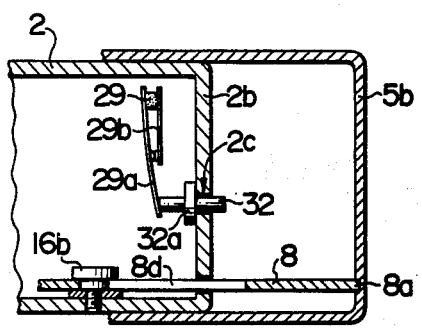
FIG. 5 is a fragmentary section of the camera constructed in accordance with one embodiment of the invention.

As shown in FIGS. 2, 3 and 5, one end 8a of a drive member 8 which forms part of the film winding mechanism is secured to the inside of the case 5b. The drive member 8 is in the form of an elongated plate which is slidable within the camera body 2 in a horizontal plane, with its end 8a extending through the right-hand wall 2b of the camera body 2 to be secured to the case 5b.

A film winding mechanism which can be driven by the drive member 8 may be constructed as shown in FIG. 3, for example. Specifically, the mechanism comprises a rocking arm 9 which is driven by the drive member 8, a feed claw 10 mounted on the arm 9, a ratchet wheel 11 driven by the claw 10 for rotation only in one direction, a back stop 12 for the ratchet wheel 11, a gear 13 disposed for integral rotation with the ratchet wheel 11, and another gear 14 operatively connected with the gear 13 through gears 33, 34 for rotating a film take-up spool 15. The gear 33 is mounted on a shaft 35 on which are mounted a pair of sprocket wheels 23a, 23b, which engage perforations in a film 24 to control the feeding operation thereof.

The drive member 8 is formed with a pair of elongated slots 8c, 8d, which are engaged by studs 16a, 16b fixedly mounted on the camera body 2, thus enabling a sliding movement of the member 8 in the horizontal direction within the camera body. A connecting pin 17 is fixedly mounted on the other end 8b of the drive member 8. The drive member 8 also serves as a stop which controls the position at which the case 5b stops when it is driven toward the second position 5bB. Specifically, when it is moved toward the second position, one edge of the slots 8c, 8d will be eventually engaged by the studs 16a, 16b, thus stopping the case 5b at the second position 5bB.

The rocking arm 9 is pivotally mounted on a shaft 18, and its free end extends below the end 8b of the drive member 8, with an elongated slot 9a formed therein into which the connecting pin 17 is loosely fitted. The feed claw 10 is pivotally mounted on a headed stud 19 which is fixedly mounted on the rocking arm 9 and is urged to rotate clockwise about the stud 19 by a torsion spring 20 which is disposed thereon, whereby it is urged into engagement with the ratchet wheel 11. The ratchet wheel 11 is rotatably mounted on the shaft 18, and is driven to rotate clockwise by the claw 10, but its rotation in the counter-clockwise direction is blocked by the back stop 12 which is pivotally mounted on a stationary pin 21 and which is urged to rotate clockwise thereabout by a torsion spring 22 which is disposed thereon, whereby it is also maintained in engagement with the ratchet wheel 11.

The gear 13 is rotatably mounted on the shaft 18 and is disposed on the upper surface of the ratchet wheel 11 for integral rotation therewith. The gear 14 is driven by the gear 13 to rotate the film take-up spool 15, and thus the film 24 which is fed by the sprocket wheels 23 is taken up on the spool. The rocking arm 9 is biased by a spring 25 to rotate counter-clockwise about the shaft 18 so as to urge the drive member 8 outwardly in order to locate the case 5b exactly at the second position when it is moved toward such position.

When the case 5b is moved from the first position 5bA (see FIG. 1) to the second position 5bB (see FIG. 2), the drive member 8 is also moved to the right or to the exterior of the camera body 2, whereby the rocking arm 9 rotates counter-clockwise about the shaft 18. As the rocking arm 9 rotates, the feed claw 10 also moves counter-clockwise about the ratchet wheel 11. After a photographing operation is completed, when the case 5b is moved from the second position to the first position, the drive member 8 is moved to the left or into the camera body 2, so that the rocking arm 9 now rotates clockwise about the shaft 18, and the ratchet wheel 11 is driven clockwise through a given angular increment by the feed claw 10. As a consequence, the gear 13 rotates integrally to rotate the gear 14 in the counter-clockwise direction to rotate the spool 15 to take up the exposed film portion thereon. In this manner, the case 5b functions as the film winding lever. It will be appreciated that a shutter charging operation may be achieved in the similar manner.

Figure 4:
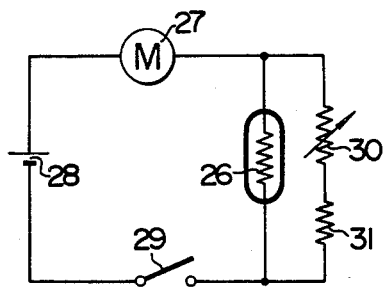
FIG. 4 is a circuit diagram of one exemplary EE circuit of the type well known in the art.

What is described is the functioning of a conventional camera 1 with sliding case, and it will be understood that when the camera 1 includes an EE mechanism or other electrical circuit, the power switch for the electrical circuit must be opened or closed when the camera is not used or used. In accordance with the invention, the switching operation of the power switch can be automatically achieved by a reciprocating movement of the sliding case 5b. FIG. 4 shows one exemplary electrical circuit of an EE mechanism which may be contained within the camera body 2. As is well known, the circuit comprises a photometric, light receiving element 26 connected in shunt with a series combination of an adjustable resistor 30 and a fixed resistor 31, the parallel combination being connected in series with a meter 27, a source battery 28 and a power switch 29.

In the embodiment shown, the power switch 29 is formed as a normally closed switch comprising a pair of a movable and stationary blades 29a, 29b as shown in FIG. 5. The switch may be operated by an operating member 32 disposed in the right-hand sidewall 2b of the camera body 2. The blades are formed of a resilient material, and the extension of the movable blade 29a urges the operating member 32 against the inner surface of the wall 2b when the blades engage each other. The operating member 32 is formed as a pin having a flange 32a formed intermediate its ends so that the portion of the pin which extends to the right of the flange 32a may extend through an opening 2c in the wall 2b into the interior of the case 5b.

When the case 5b is in its first position or when the camera 1 is not used, the operating member 32 is pushed by the case 5b, whereby the movable blade 29a is urged by the member 32 to move away from the stationary blade 29b, thus opening the power switch 29. When the camera 1 is to be used, the case 5b is moved from the first to second position, whereupon it moves away from the right-hand wall 2b of the camera body 2 to free the operating member 32, which is therefore urged by the resilience of the blade 29a against the right-hand wall 2b. The movable blade 29a engages the stationary blade 29b, thus closing the power switch 29.

From the above description, it will be seen that an assurance is given by the present invention that whenever the camera 1 is put to use by placing the case 5b in its second position, the power switch 29 is closed, while it is opened whenever the camera 1 is not used by placing the case 5b in its first position. It will be noted that the operation of the power switch 29 takes place automatically in a manner similar to the film winding operation as the case 5b is moved.

In the embodiment described above, the power switch 29 is formed by blades 29a, 29b, one of which is operated by the case 5b through the operating member 32, but if the power switch 29 is formed as a microswitch, for example, the actuator pin of the microswitch may extend through the opening 2c. It should be noted that the use of the power switch is not limited to the EE circuit, but may be used in any other electrical circuit such as photometric device, battery check circuit or any other indicator circuit.

Figure 6:
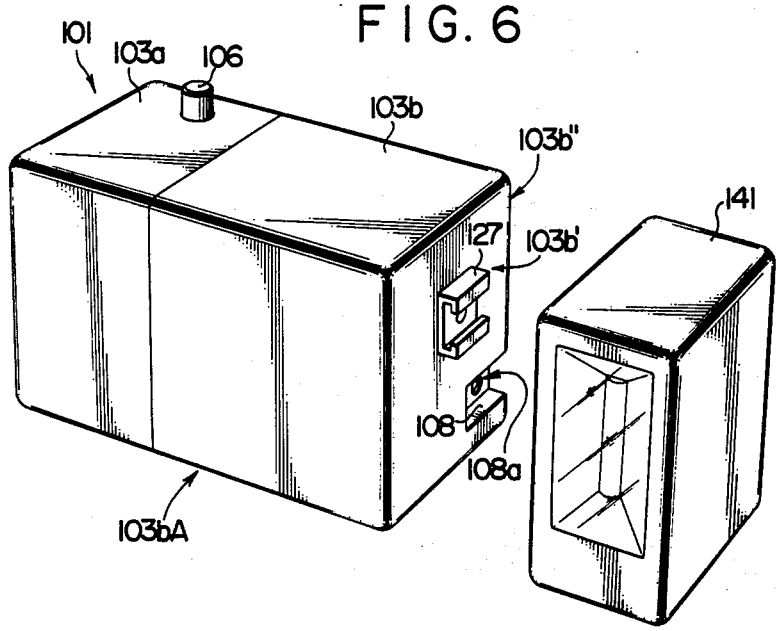
FIG. 6 is a perspective view of the camera according to another embodiment.
Figure 7:
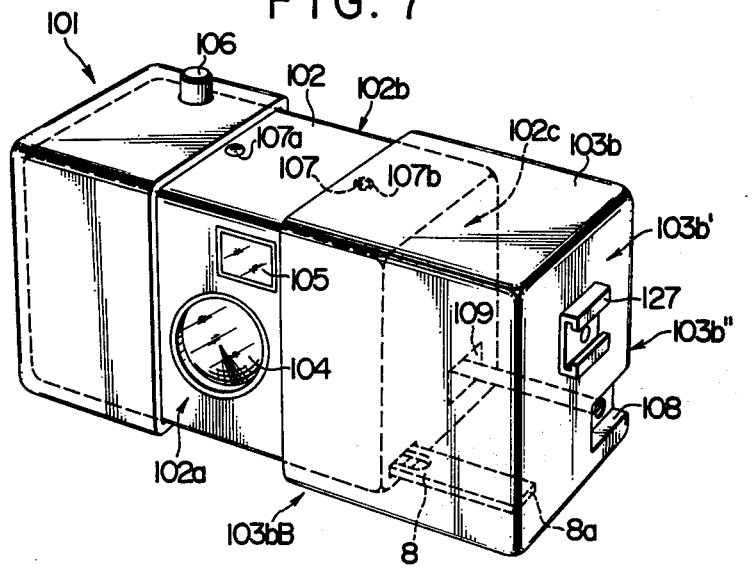
FIG. 7 is a perspective view of the camera shown in FIG. 6 when the sliding part of the case is moved to a position in which the camera may be used.

FIG. 6 shows another embodiment of the camera according to the invention to which a strobo unit may be mounted. In this case, the movement of the sliding case in one direction closes the power switch for the strobo unit while its movement in the opposite direction performs a film winding operation. Referring to FIG. 6, there is shown a camera 101 with sliding case and a strobo unit 141 which may be attached thereto. The camera 101 includes a camera body 102 (see FIG. 7) and a sliding case 103b in a manner similar to the previous embodiment. In FIG. 6, the case 103b is shown in its first position 103bA in which a taking lens 104 and a window 105 for viewfinder of the camera body 102 are covered by the case 103b. FIG. 7 shows a second position 103bB of the case 103b. The arrangement of the taking lens 104 and the viewfinder window 105 is similar as before. The portion of the camera body 102 which is located to the left of the taking lens 104, as viewed in FIG. 7, is housed within a stationary case 103a to which it is secured. As before, a shutter button 106 extends through an opening in the case 103a to project externally of the camera body 102.

The portion of the camera body 102 located to the right of the taking lens 104 and the window 105 are housed in a sliding case 103b which is disposed to be slidable relative to the camera body 102. As before, the case 103b is movable between a first position 103bA (see FIG. 6) in which it covers at least the taking lens 104 and the window 105 of the camera body 102, and a second position 103bB in which the taking lens 104 and the window 105 are exposed. In the first position, the camera 101 cannot be used, and a recess 107a formed in the top surface of the camera body 102 is engaged by a resilient dowel 107 formed on the inner wall of the case 103b, thus maintaining the case 103b in such position. In the second position 103bB, the camera 101 can be used, and the case 103b is maintained in this position by the engagement of the dowel 107 with another recess 107b formed in the top surface of the camera body 102.

As before, one end 8a of the drive member 8 associated with the film winding mechanism is secured to be inside of the right-hand wall 103b' of the case 103b, and the member 8 is disposed for sliding movement into and out of the camera body 102 generally as mentioned before. An accessory receiver or an accessory shoe 127 comprising a hot shoe of a known form is disposed centrally on the outside of the right-hand wall 103b' of the case 103b for engagement with a mounting fixture 142 (see FIG. 8) provided on the strobo unit 141. In the bottom portion of the wall 103b', there is formed a horizontal channel 108 which extends to the rear wall 103'' of the case 103b. The strobo unit 141 includes a power supply switching member 143 (see FIG. 9) which is received in a rectangular projection 144, which is adapted to fit into the horizontal channel 108 at the same time as the strobo unit is attached to the accessory shoe 127.

Figure 9:
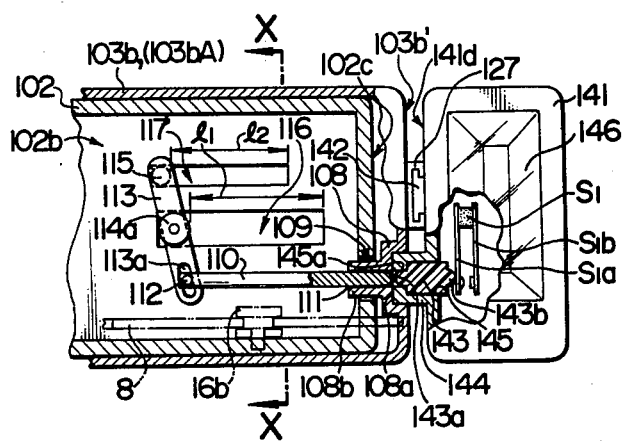
FIG. 9 is a fragmentary section of the camera shown in FIGS. 6 and 7 when it is coupled with the strobo unit shown in FIG. 8, the camera being shown in a position which it assumes when not in use.

As shown in cross section in FIG. 9, the horizontal channel 108 has a bottom wall 108a which is centrally formed with a pillar extending into the case 103b and having its free end 108b fitted into a square opening 109 (see FIG. 7) formed in the right-hand sidewall 102c of the camera body 102. The pillar is centrally formed with a bore 111 which extends in a direction parallel to the bottom surface of the case 103b, and the free end of a switch operating member 110, shown in the form of a round rod, is slidably received in the bore 111. The other end of the switch operating member 110 fixedly carries a pin 112 which extends in a direction toward the rear wall 102b of the camera body 102. The pin 112 fits in an elongated guide slot 113a formed in one end of a lever 113, which is rotatably supported, by means of a headed screw 114a, on the free end of a support shaft 114 which is fixedly mounted on the rear wall 103b'' of the case 103b. A pin 115 is fixedly mounted on the other end of the lever 113 and extends in a direction parallel to the support shaft 114. The free end of the pin 115 is fitted into an elongated guide slot 117 formed in the rear wall 102b of the camera body 102 and extending in a direction parallel to the bottom surface thereof. It will be noted that the support shaft 114 extends through an elongated guide slot 116, formed in the rear wall 102b at a position below the slot 117, and is secured to the sliding case 103b.

Representing the length of the slots 116, 117 by $l_1$, $l_2$ respectively, the length $l_1$ is greater than the length $l_2$, and the difference $\Delta l$ is chosen sufficient to operate a power switch S1. When the sliding case 103b is moved relative to the camera body 102 from the first position 103bA (see FIG. 6) to the second position 103bB (see FIG. 7), the pin 115 initially bears against the right-hand edge of the slot 117, and then the support shaft 114 can move through a distance corresponding to the length difference $\Delta l$, whereby the lever 113 is rotated counterclockwise about the shaft 114, causing the pin 112 to drive the switch operating member 110 to the right so that the free end thereof projects through the bottom of the horizontal channel 108 to operate the switch S1.

Figure 8:
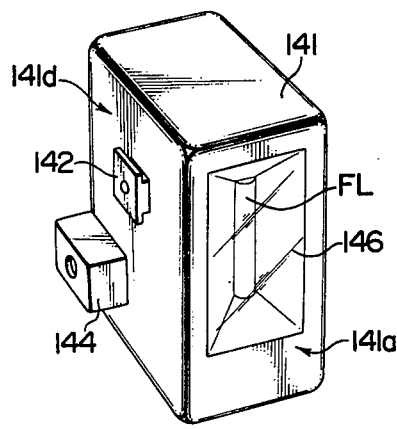
FIG. 8 is a perspective view of a strobo unit which may be mounted on the camera shown in FIG. 6.

As will be noted from FIGS. 8 and 9, the strobo unit 141 is configured and sized commensurate with the camera 101, when it is mounted thereon, as considered in the vertical direction and in the front-to-back direction. The mounting fixture 142 and the projection 144 which internally houses the operating member 143 are located on the left-hand sidewall 141d of the strobo unit so that they can engage the accessory shoe 127 and the horizontal channel 108 when the unit 141 is mounted on the case 103b.

As shown in FIG. 9, the projection 144 is internally formed with a round opening 145 which opens into the interior thereof and which slidably receives the strobo power supply operating member 143 in the form of a solid cylindrical rod of an electrically insulating material. On its opposite end faces, the operating member 143 is formed with a pair of tabs 143a, 143b of a reduced diameter, with the left-hand tab 143a being located in opposing relationship with the bore 111 formed in the bottom 108a of the horizontal channel 108 and fitted into a through-opening 145a formed in the bottom wall of the round opening 145. The right-hand tab 143b is disposed in contact with a movable blade S1a of the power switch S1 located within the strobo unit 141 and which is normally open. The movable contact or blade S1a has a resilience which urges the operating member 143 into the round opening 145 and urges the left-hand tab 143a into the through-opening 145a, but the arrangement is such that the end of the tab 143a does not project out of the end face of the projection 144. Under this condition, the movable contact S1a is removed from a corresponding stationary contact S1b to maintain the switch S1 open as shown in FIG. 9.

Figure 11:
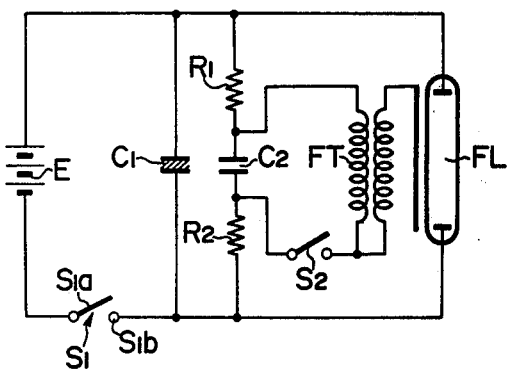
FIG. 11 is a circuit diagram of one exemplary electrical circuit of the strobo unit which may be used in the camera of the invention.
Figure 12:
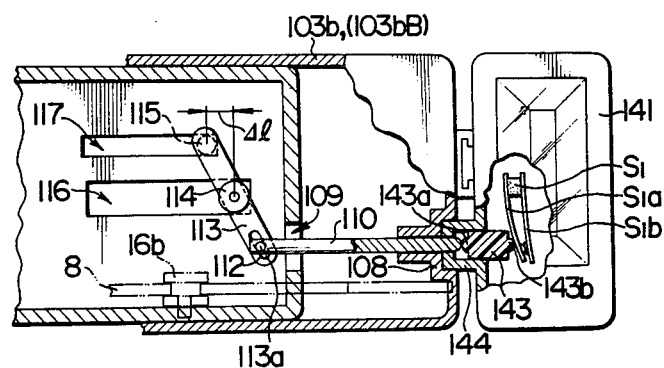
FIG. 12 is a fragmentary view, partly in section, illustrating the operation of the camera.

The strobo unit 141 includes a front surface 141a in which is formed a window 146 for placement of a light diffuser therein, as shown in FIG. 8. A flash discharge tube FL is located inside the window. In addition to the switch S1, the unit 141 internally houses a battery and an electrical circuit (not shown). The electric circuit of the unit 141 may be conventional, and can be constructed as shown in FIG. 11, for example. Specifically, the positive terminal of a battery E is connected with the positive electrode of the tube FL, the negative electrode of which is connected through the power switch S1 with the negative terminal of the battery E. A main capacitor C1 is connected in shunt with the tube FL as is a trigger circuit comprising resistor R1, trigger capacitor C2 and resistor R2. A trigger transformer FT is connected in series with a trigger switch S2 across the trigger capacitor C2. The trigger switch S2 is disposed within the camera, and is connected with the electrical circuit of the strobo unit 141 through the mounting fixture 142 and the accessory shoe 127 in order to be operated in synchronism with the shutter operation of the camera.

In operation, when the sliding case 3b is moved from its first position 103bA to the second position 103bB, the support shaft 114 moves to the right along the slot 16 until it bears against the right-hand edge thereof. Accordingly, the lever 113 also moves to the right, and the pin 115 fixedly mounted on the end thereof moves along the slot 117. However, the pin 115 bears against the right-hand edge of the slot 117 when the support shaft 114 is located at distance of Δl from the right-hand edge of the slot 116. As a consequence, as the shaft 114 continues to move, the lever 113 rotates counter-clockwise about the shaft 114, casing the pin 112 which fits in the slot 113a to move the switch operating member 110 to the right until its free end projects above the bottom of the horizontal channel 8 of the sliding case 103b. Thereupon, the left-hand tab 143a of the operating member 143, located in opposing relationship with the member 110, is driven to the right to cause its right-hand tab 143b to urge the movable contact S1a into engagement with the contact S1b to close the switch S1 while overcoming the resilience of the movable blade. When the switch S1 is closed, the capacitors C1 and C2 shown in the electrical circuit of FIG. 11 are charged, and subsequently when the switch S2 is closed in response to a shutter operation, the trigger voltage is applied to the trigger electrode of the flash discharge tube FL, which therefore produces a flash illumination for permitting a photographing operation. Obviously, the switch S1 will be opened when the case 103b is moved from the second toward the first position.

The described camera may include a film winding mechanism which may be constructed in the same or similar manner as that shown in FIG. 3. Since the construction may be quite similar, it will not be repeatedly described. However, it is to be noted that when the sliding case moves from the first to the second position, the mechanism is ready to perform a film winding operation, which takes place for one exposed frame of the film 24 when the case moves from the second to the first position. Again, a shutter charging operation may be performed by the movement of the sliding case.

Figure 13:
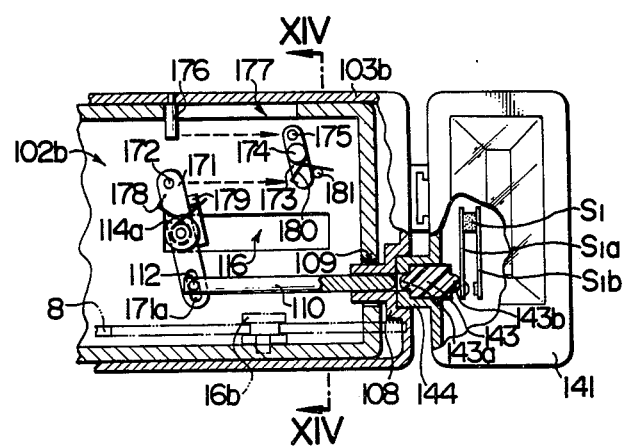
FIG. 13 is a similar view to FIG. 12, but illustrating another embodiment of the invention.
Figure 14:
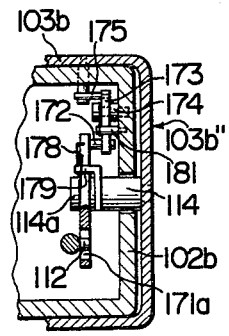
FIG. 14 is a cross section taken along the line XIV—XIV shown in FIG. 13.

FIGS. 13 and 14 show another embodiment in which the lever utilized for operating the switch operating member is associated with an auxiliary lever which is substituted for the slot 117. In this embodiment, the general arrangement is similar to that described above except for the specific construction which is utilized to operate the switch operating member. Therefore, similar parts are designated by like reference characters without repeating the description.

Figure 10:
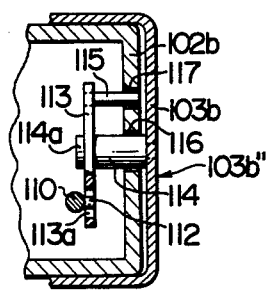
FIG. 10 is a cross section taken along the line X—X shown in FIG. 9.

FIG. 13 is a cross section corresponding to FIG. 9, and FIG. 14 is a cross section corresponding to FIG. 10. In these Figures, a lever 171 which operates the switch operating member 110 is pivotally mounted on the support shaft 114 secured to the rear wall 103b″ (see FIG. 7) of the case 103b, with the headed screw 114a locking it in position. An elongated guide slot 171a is formed in one end of the lever 171, and is engaged by the pin 112 which is fixedly mounted on the inner end of the switch operating member 110. The other end of the lever 171 fixedly carries a depending pin 172 which is adapted to bear against the lateral edge of one end of an auxiliary lever 173 to be described shortly. The lever 171 is urged to rotate clockwise by a torsion spring 178 disposed on the support shaft 114 and having its opposite ends engaged with the opposite sides of the lever. However, the resulting rotation is limited by the abutment of its one lateral edge against a detent 179.

The auxiliary lever 173 is pivotally mounted on a support shaft 174 secured to the rear wall 102b of the camera body 102 at a position above the right-hand end of the slot 116 in which the support shaft 114 of the lever 171 fits. One end of the lever 173 is located on the path of movement of the pin 172 on the lever 171 so that its lateral edge can be engaged by the pin 172. A pin 175 is fixedly mounted on the other end of the auxiliary 173 and is located on the path of movement of a depending pin 176 fixedly mounted on the top wall of the case 103b as it moves along an elongated guide slot 177 formed in the top wall of the camera body 102. The lever 173 is urged to rotate counter-clockwise about the shaft 174 by a torsion spring 180, but is normally blocked to rotated by a stop pin 181.

In operation, when the case 103b is moved relative to the camera body 102 from the first position 103bA to the second position 103bB, the lever 171 and the support shaft 114 move to the right along the slot 116 until the shaft 114 abuts against the right-hand edge of the slot. Simultaneously, the depending pin 176 moves to the right along the slot 177 to bear against the pin 175 on the auxiliary lever 173 in a cruciform manner and drives it to cause a clockwise rotation of the lever 173 about the support shaft 174. Since the pin 172 on the lever 171 is engaged with the lateral edge of the adjacent end of the lever 173 by this time, the rotation of the lever 173 urges the pin 172 to the left, whereby the lever 171 rotates counter-clockwise. This motion is transmitted through the pin 112, engaging the slot 171a, to cause a movement of the switch operating member 110 to the right, thus closing the power switch S1 of the strobo unit 141 in the same manner as before. It will be understood by one skilled in the art that any other means or member may be used to operate the switch operating member 110. Further, in the present invention, the stationary case 5a (see FIG. 1) and 103a (see FIG. 6) may be formed by the external wall of the camera itself.

What is claimed is:

1. The combination of a camera and a strobo unit comprising a sliding case movable relative to a camera body between a first position in which it covers at least the taking lens of the camera and a second position in which the taking lens is exposed, an accessory receiving member mounted on the sliding case, a switch operating mechanism arranged within the sliding case and camera, said strobo unit including a mounting fixture adapted to engage the accessory receiving member and also including a power switch means disposed in opposing relationship to said switch operating mechanism, the power switch means being closed by said switch operating mechanism when the sliding case is moved to the second position.

2. A camera according to claim 1, further including a film winding mechanism which is operable to perform a film winding operation as the sliding case is moved from the second to the first position.

3. A camera according to claim 1 in which the power switch means is operatively connected with a swingable mechanism assembled with the switch operating member which swingable member rocks in response to a movement of the sliding case.

4. The camera of claim 1 wherein the switch operating mechanism comprises a swingable member having a pivot mounted to move with said sliding case and a power switch operating arm extending between said swingable member and said power switch means; and means provided in said camera for moving said swingable arm to cause the operating arm to close the power switch means when the case is moved to said second position.

5. The camera of claim 4 wherein said swingable arm is pivoted intermediate its ends, one of said ends engaging said operating arm and the opposite end having a projection;

said camera having an abutting means in the path of movement of said projection for abutting against said projection to urge said swingable member in a direction to close said switch means when the case is moved to said second position.

6. The camera of claim 5 wherein said abutting means comprises a slot in which said projection is guided; one end of said slot serving to rotate said swingable member in the direction to close the power switch means when the case is in the second position.

7. The camera of claim 5 wherein the abutting means comprises a second swingable arm and means to rotate the second arm in a first direction; a projection along one side of said case and extending into the camera for rotating the second arm in a second direction opposite said first direction to engage the first mentioned swingable arm and move it in the direction to close the power switch means when the case is in the second position.

* * * * *

UNITED STATES PATENT AND TRADEMARK OFFICE
CERTIFICATE OF CORRECTION

PATENT NO. : 4,189,222
DATED : February 19, 1980
INVENTOR(S) : Yoshihisa Maitani It is certified that error appears in the above-identified patent and that said Letters Patent are hereby corrected as shown below:

Column 1, line 16, after "not", insert --in--;

Column 4, line 30, delete "a";

Column 9, line 15, change "mechanism", to --member--;

line 15, delete "mem-";

line 10, delete "ber" and substitute therefor --mechanism--.

Signed and Sealed this

Eleventh Day of November 1980

[SEAL]

Attest:

SIDNEY A. DIAMOND

Attesting Officer      Commissioner of Patents and Trademarks